United States Patent
Corsmeier et al.

(10) Patent No.: US 10,519,794 B2
(45) Date of Patent: Dec. 31, 2019

(54) SEALING SYSTEM FOR SEALING AGAINST A NON-CYLINDRICAL SURFACE

(71) Applicant: General Electric Company, Schenectady, NY (US)

(72) Inventors: Donald Michael Corsmeier, West Chester, OH (US); Donald Scott Yeager, Loveland, OH (US)

(73) Assignee: General Electric Company, Schenectady, NY (US)

( * ) Notice: Subject to any disclaimer, the term of this patent is extended or adjusted under 35 U.S.C. 154(b) by 107 days.

(21) Appl. No.: 15/207,596

(22) Filed: Jul. 12, 2016

(65) Prior Publication Data

US 2018/0016927 A1    Jan. 18, 2018

(51) Int. Cl.
    *F02C 7/18*    (2006.01)
    *F01D 11/00*    (2006.01)
    *F23R 3/00*    (2006.01)
    *F01D 9/02*    (2006.01)
    *F02C 7/28*    (2006.01)

(52) U.S. Cl.
    CPC ............ *F01D 11/003* (2013.01); *F01D 9/023* (2013.01); *F23R 3/002* (2013.01); *F02C 7/28* (2013.01); *F05D 2240/35* (2013.01); *F23R 2900/00012* (2013.01)

(58) Field of Classification Search
    CPC .... F02C 7/18; F05D 2240/55; F05D 2240/58; F23R 3/002; F23R 3/60; F23R 2900/00012; F01D 11/003; F01D 11/005; F01D 9/023
    See application file for complete search history.

(56) References Cited

U.S. PATENT DOCUMENTS

| 4,123,072 | A  | * | 10/1978 | Sharpe ................... | B23P 15/06 277/453 |
| 5,252,026 | A  | * | 10/1993 | Shepherd ............... | F01D 5/081 415/115 |
| 6,647,729 | B2 | * | 11/2003 | Calvez ................... | F23R 3/007 60/753 |
| 6,854,738 | B2 | * | 2/2005  | Matsuda ................ | F01D 9/023 277/632 |
| 6,916,154 | B2 | * | 7/2005  | Synnott ................... | F01D 9/041 415/208.2 |
| 2002/0184892 | A1 | * | 12/2002 | Calvez ................... | F23R 3/007 60/796 |
| 2013/0224011 | A1 | * | 8/2013  | Hashimoto .............. | F02C 7/28 415/211.2 |

(Continued)

*Primary Examiner* — Steven M Sutherland
*Assistant Examiner* — James P McGlynn
(74) *Attorney, Agent, or Firm* — Dority & Manning, P.A.

(57) ABSTRACT

The present disclosure is directed to a sealing system for a turbine engine including an engine component, the engine component defining an oblique sealing surface defining an annular shape. The oblique sealing surface defines an oblique angle with a centerline of the engine component. The sealing system includes a seal housing and a seal ring. The seal housing is annular and includes a groove that is defined by a first sidewall, a second sidewall, and an end wall connecting the first sidewall and the second sidewall. The seal ring is positioned at least partially within the groove in the seal housing. The seal ring defines a seal contact surface for forming a seal with the oblique sealing surface of the engine component.

14 Claims, 8 Drawing Sheets

(56) References Cited

U.S. PATENT DOCUMENTS

| | | | |
|---|---|---|---|
| 2015/0121880 A1* | 5/2015 | Kidder | F02C 3/04 |
| | | | 60/726 |
| 2015/0204447 A1* | 7/2015 | Kloepfer | F01D 9/041 |
| | | | 277/306 |
| 2016/0061330 A1* | 3/2016 | Davis | B23K 31/02 |
| | | | 277/355 |

* cited by examiner

SEALING SYSTEM FOR SEALING AGAINST A NON-CYLINDRICAL SURFACE

FEDERALLY SPONSORED RESEARCH

This invention was made with government support under Contract No. FA8650-07-C-2802 awarded by the United States Department of the Air Force. The government has certain rights in this invention.

FIELD OF THE INFORMATION

The present subject matter relates generally to gas turbine engine sealing systems.

BACKGROUND OF THE INVENTION

A gas turbine engine utilizes numerous and various sealing systems designs to restrict the flow of fuels, oils, and gases within the turbine engine system, its modules, and its components. A gas turbine engine generally includes, in serial flow order, a low pressure (LP) compressor, a high pressure (HP) compressor, a combustion section, a HP turbine, and a LP turbine. A HP shaft couples the HP turbine to the HP compressor. An LP shaft extends coaxially within the HP shaft and couples the LP turbine to the LP compressor.

Each shaft rotates on a number of bearings located generally at a forward end and an aft end of each shaft. Bearings are generally a component of an assembly that includes lubrication systems, dampeners, and sealing systems to restrict the interchange of fluids from bearing compartments and the rotating structure.

Additionally, within the rotating structure and the turbine engine gas path, a number of various seals are employed to restrict the interchange of high pressure and high temperature fluids from low pressure and low temperature sections. Seals are also employed to keep fluids within the gas path rather than migrating to other cavities and compartments within the engine.

However, the challenge of restricting fluid interchange and migration is a function of the type of fluid, pressure and temperature, and geometric constraints between the areas to be sealed. Furthermore, weight and dimensional packaging further limit design options for sealing systems, including by dictating or constraining the geometry of an adjacent sealing surface. Where a high pressure fluid is to be segregated from a low pressure fluid in an apparatus in which a centerbody may move parallel to the centerline of a surrounding liner, such as a piston in a cavity, the use of a piston seal may alone necessitate a cylindrical cavity with an inner surface onto which a piston seal may operate.

For example, a high pressure fluid within and around a combustor necessitates a sealing system to restrict fluid interchange with a downstream low pressure cavity of a turbine section. Conventionally, piston ring seals are employed to restrict fluid interchange. However, piston ring seals require a cylindrical sealing surface, of which may add material, weight, axial length, or other design features that reduce engine efficiency, reduce component structural life, or increase the risk of defects, and thereby increase associated costs of manufacturing and maintenance.

Therefore, a sealing system for restricting the fluid interchange of a high pressure fluid and a low pressure fluid capable of overcoming the above complexities would be useful.

BRIEF DESCRIPTION OF THE INVENTION

Aspects and advantages of the invention will be set forth in part in the following description, or may be obvious from the description, or may be learned through practice of the invention.

The present disclosure is directed to a sealing system for a turbine engine including an engine component, the engine component defining an oblique sealing surface defining an annular shape. The oblique sealing surface defines an oblique angle with a centerline of the engine component. The sealing system includes a seal housing and a seal ring. The seal housing is annular and includes a groove that is defined by a first sidewall, a second sidewall, and an end wall connecting the first sidewall and the second sidewall. The seal ring is positioned at least partially within the groove in the seal housing. The seal ring defines a seal contact surface for forming a seal with the oblique sealing surface of the engine component.

A further aspect of the present disclosure is directed to a combustion chamber, including a structural member, a liner, a seal housing, a seal ring, and a turbine nozzle, in which the turbine nozzle includes an inner band defining a curved portion. The liner defines a sealing surface. The sealing surface defines an annular shape and an oblique angle with a centerline of the liner. The seal housing is annular and includes a groove that is defined by a first sidewall, a second sidewall, and an end wall connecting the first sidewall and the second sidewall. The end wall is generally opposed to the sealing surface on the liner. The seal ring is positioned at least partially within the groove in the seal housing. The seal ring is positioned at least partially between the seal housing and the sealing surface. The seal ring defines a seal contact surface for forming a seal with the oblique sealing surface of the liner.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

A sealing system that segregates a high pressure fluid from a low pressure fluid within a non-cylindrical annular cavity is generally provided. The sealing system includes a mechanically sprung split seal ring contained in a groove of a seal housing, in which the groove is opposed to a non-cylindrical annular sealing surface.

The present disclosure improves upon piston ring sealing assemblies by sealing a high pressure fluid from a low pressure fluid while removing geometric constraints that are specific to piston ring sealing assemblies. By eliminating the need to build in a cylindrical surface onto the sealing surface that may have no other design utility, turbine engine weight and axial dimension are reduced. By reducing weight, turbine engine fuel efficiency and power output are improved. Furthermore, by reducing axial dimension, these improvements are placed in a smaller packaging, of which is an important design criterion for aircraft turbine engines. Additionally, the present disclosure removes local variations in sealing surface thickness that may result in temperature differentials that increase stress and strain and increase the risk and occurrence of manufacturing defect.

Although the disclosure below is in reference to a combustion section 26 of a turbofan engine 10 and its downstream attachments, the present disclosure is applicable generally to sealing systems in a gas turbine engine. Additionally, the present disclosure is applicable generally to reciprocating engines and turbomachinery, turbofan, turbojet, turboprop, and turboshaft engines, including industrial and marine gas turbine engines, and auxiliary power units.

Figure 1:
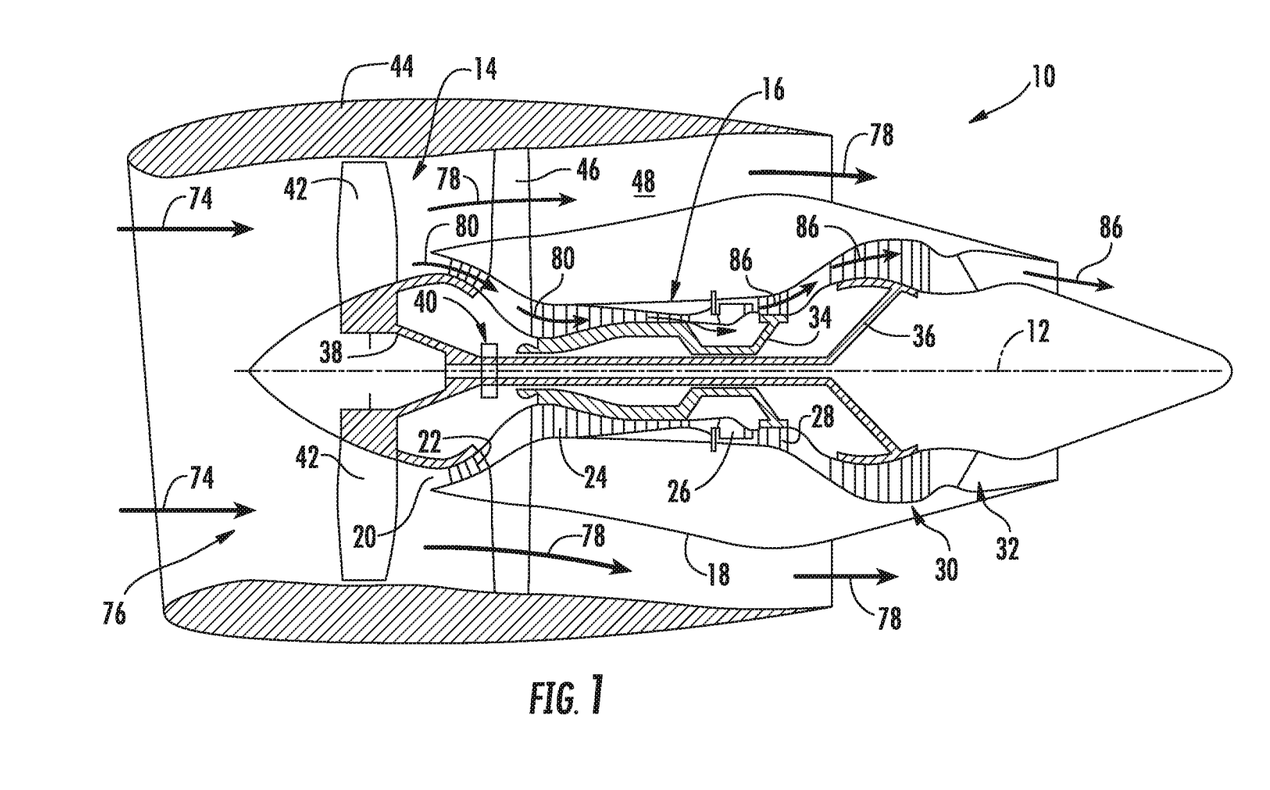
FIG. 1 is a schematic cross-sectional view of an exemplary high-bypass turbofan jet engine.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction AA (extending parallel to a longitudinal centerline 12 provided for reference) and a radial direction RR. In general, the turbofan 10 includes a fan section 14 and a core turbine engine 16 disposed downstream from the fan section 14.

The gas turbine engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a HP turbine 28, a LP turbine 30 and a jet exhaust nozzle section 32. An HP rotor shaft 34 drivingly connects the HP turbine 28 to the HP compressor 24. An LP rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the gas turbine engine 16. It should be appreciated by those of ordinary skill in the art that the nacelle 44 may be configured to be supported relative to the gas turbine engine 16 by a plurality of circumferentially-spaced outlet guide vanes or struts 46. Moreover, at least a portion of the nacelle 44 may extend over an outer portion of the gas turbine engine 16 so as to define a bypass airflow passage 48 therebetween.

During operation of the turbofan 10, as shown in FIG. 1, a volume of air as indicated schematically by arrows 74 enters the turbofan 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26.

Figure 2:
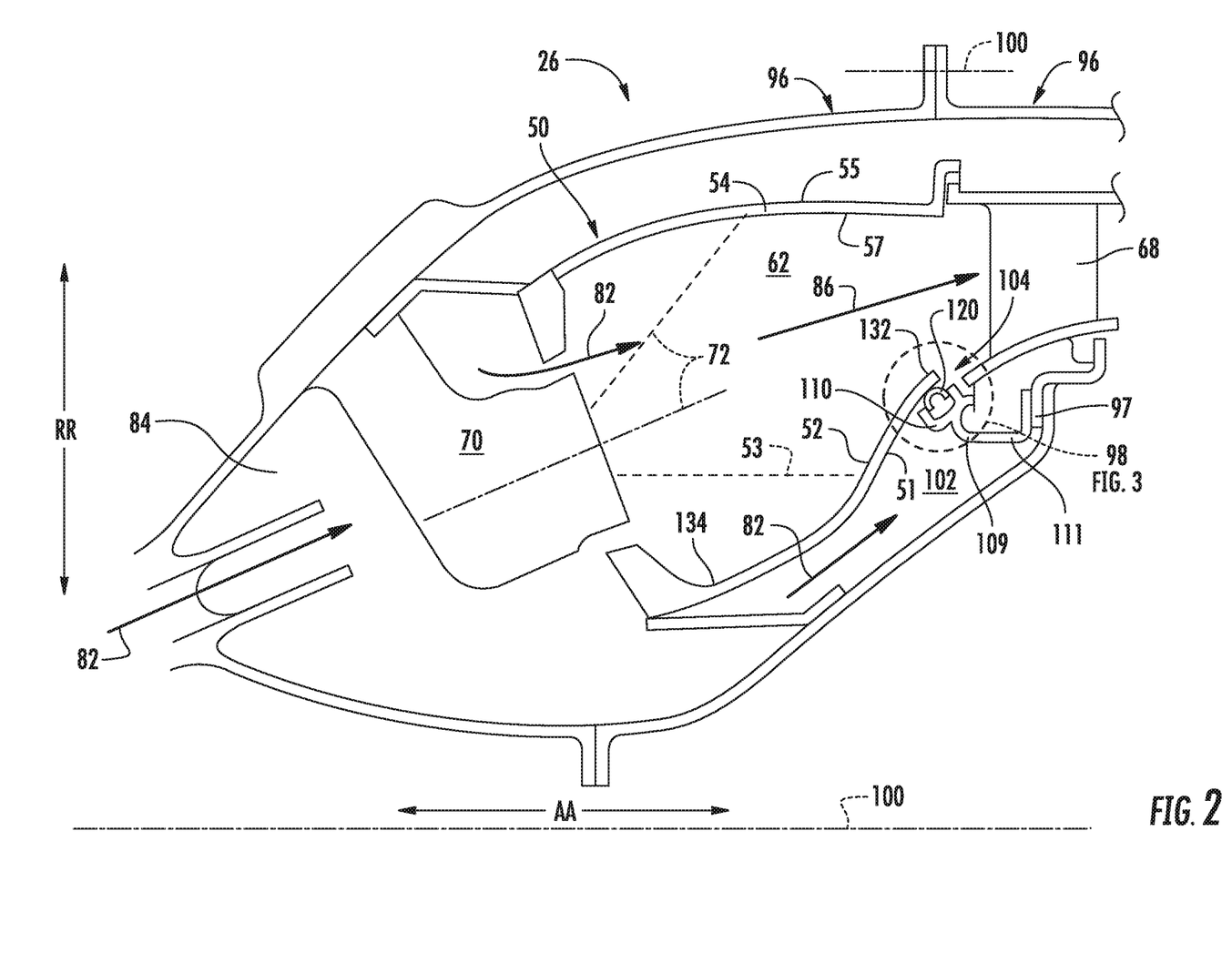
FIG. 2 is a cross sectional side view of a combustion section of the high by-pass turbofan jet engine as shown in FIG. 1.

A cross sectional side view of a combustion section 26 of the engine 10 is shown in FIG. 2. The now compressed air as indicated schematically by arrows 82 flows into a diffuser cavity or head end portion 84 of the combustion section 26. A fuel injector or nozzle 70 may extend at least partially through a combustion section 26 and provide a fuel 72 to the combustion chamber 62. Compressed air 82 and fuel 72 are mixed and ignited to release combustion gases 86 generated in the combustion chamber 62 to flow into the HP turbine 28, thus causing the HP rotor shaft 34 to rotate, thereby supporting operation of the HP compressor 24.

For the embodiment depicted in FIG. 2, where an inner liner 52 or an outer liner 54 of the combustor 50 extend axially from a forward end 134 of the combustion section 26 to an aft end 132 to generally meet the turbine nozzle 68, an exemplary embodiment of a sealing system 98 segregates a high pressure fluid 102 from a low pressure fluid 104 toward the aft end 132. The high pressure fluid 102 is compressed air 82, combustion gases 86, or a mixture thereof. The inner liner 52 includes an inside surface 51 radially inward of the inner liner 52 and an outside surface 53 radially outward of the inner liner 52. The inside surface 51 and the outside surface 53 are generally parallel in relationship across axial direction AA to maintain a constant thickness across the inner liner 52. The outer liner 54 includes an inside surface 57 and an outside surface 55 configured similarly to the inner liner 52. The sealing system 98 acts upon the inside surface 51 of the inner liner 52, which segregates the high pressure fluid 102 from the low pressure fluid 104. The inside surface 51 of the inner liner 52 is an annular shape and an oblique angular relationship (i.e. not parallel or perpendicular) to an axial reference line 100.

It should be appreciated, however, that in other embodiments, a sealing surface 108 such as the inside surface 51 of the inner liner 52, upon which the sealing system 98 acts to segregate the high pressure fluid 102 from the low pressure fluid 104, may be the outer surface 55 of the outer liner 54. The outer surface 55 defines an oblique angular relationship to the axial reference line 100 of the combustor 50. The structural member 97 onto which the sealing system 98 mounts may be of an outer wall 96 of the combustion section 26 or the HP turbine 28. In other embodiments, the sealing system 98 is located in the LP compressor 22, or the HP compressor 24, LP turbine 30, or a bearing compartment (see FIG. 1). Additionally, it should be appreciated that the structural member 97 is generally a feature on the engine 10 onto which the sealing system 98 mounts to act upon the sealing surface 108 that defines an oblique angular relationship to the axial reference line 100 of an engine component 106. Although not depicted in greater detail, the exemplary sealing system 98 as applied to the inner liner 52 is configured in substantially the same manner with regard to FIG. 3 below.

The sealing system 98 is mounted onto a structural member 97 of the combustion section 26 or the HP turbine 28. The sealing system 98 includes a split seal ring 120, a seal housing 110, a first end 109 connected to the seal housing 110, and a second end 111 connected to the structural member 97.

In one embodiment, the first end 109, the second end 111, and the seal housing 110 may be a single, unitary structure, such as, but not limited to, castings, or additive manufactured structures, or machined forgings. In another embodiment, the first end 109 is formed of a first material of a first coefficient of thermal expansion and the second end 111 is formed of a second material of a second coefficient of thermal expansion. The sealing system 98 having such a configuration reduces a loss of compression of the seal ring 120 which may otherwise occur due to the mismatch between the coefficients of thermal expansion of the inner liner 52, or outer liner 54, or another engine component 106 formed of a CMC or cast metal material, and the plurality of seal housing components formed of a metal material. For example, with such a configuration, the second end 111 of the sealing system 98 is configured to expand in a manner such that the first end 109 remains proximate to the aft end 132 of the inner liner 52 during operation of the turbofan engine 10.

The inner liner 52 and the outer liner 54 are, in certain embodiments, each formed of a ceramic matrix composite (CMC) material, which is a non-metallic material having high temperature capability. Exemplary CMC materials utilized for such liners 52, 54 may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about $1.3 \times 10^{-6}$ in/in/° F. to about $3.5 \times 10^{-6}$ in/in/° F. in a temperature of approximately 1000-1200° F.

In one embodiment, the inner and outer liners 52, 54 are formed by a plurality of layers of CMC plies. The plies may be plies that are pre-impregnated (pre-preg) with matrix material and may be formed from pre-preg tapes or the like. For example, the CMC plies may be formed from a pre-preg tape comprising a desired ceramic fiber reinforcement material, one or more precursors of the CMC matrix material, and organic resin binders. Pre-preg tapes may be formed by impregnating the reinforcement material with a slurry that contains the ceramic precursor(s) and binders. The slurry may contain solvents for the binders that promote the fluidity of the slurry to enable impregnation of the fiber reinforcement material, as well as one or more particulate fillers intended to be present in the ceramic matrix of the inner and outer liners 52, 54, e.g., silicon and/or SiC powders in the case of a Si—SiC matrix. Preferred materials for the precursor will depend on the particular composition desired for the ceramic matrix of the inner and outer liners 52, 54. For example, the precursor material may be SiC powder and/or one or more carbon-containing materials if the desired matrix material is SiC. Carbon-containing materials include carbon black, phenolic resins, and furanic resins, including furfuryl alcohol ($C_4H_3OCH_2OH$).

The CMC material used is configured as a continuous fiber reinforced CMC material. For example, suitable continuous fiber reinforced CMC materials may include, but are not limited to, CMC materials reinforced with continuous carbon fibers, oxide fibers, silicon carbide monofilament fibers and other CMC materials including continuous fiber lay-ups and/or woven fiber preforms. In other embodiments, the CMC material used is configured as a discontinuous reinforced CMC material. For instance, suitable discontinuous reinforced CMC materials may include, but are not limited to, particulate, platelet, whisker, discontinuous fiber, in situ and nano-composite reinforced CMC materials.

Referring back to FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the gas turbine engine 16 to provide propulsive thrust.

Figure 3:
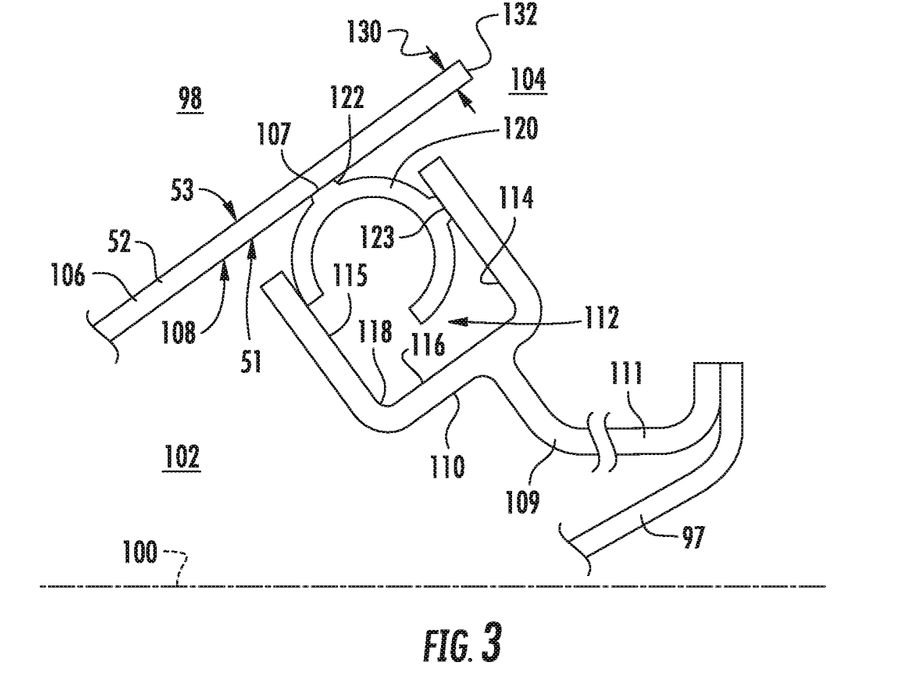
FIG. 3 is a cross sectional side view of an exemplary embodiment of the disclosed sealing system.

Referring now to FIG. 3, a cross sectional side view of an exemplary embodiment of a sealing system 98 that separates a high pressure fluid 102 from a low pressure fluid 104 across a sealing surface 108 on an engine component 106 of a non-cylindrical annular profile is provided. The sealing system 98 may be configured in a similar manner to the sealing system 98 depicted in FIG. 2 and described above. Accordingly, the same or similar numbers may refer to the same or similar part.

The sealing system 98 includes an annular seal housing 110 that includes a first sidewall 114, a second sidewall 115, and an end wall 116. The first sidewall 114, the second sidewall 115, and the end wall 116 together define a groove 112. The end wall 116 connects the first sidewall 114 and the second sidewall 115. The end wall 116 is generally opposed to the sealing surface 108 on the engine component 106. The sealing surface 108 defines an annular shape and an oblique angular relationship to an axial reference line 100 of the engine component 106 that includes the sealing surface 108. In certain embodiments, the axial reference line 100 may be the axial centerline of the engine 10 within which the engine component 106 is installed.

The sealing system 98 includes a seal ring 120 positioned at least partially in the groove 112, contacting the sealing surface 108 of the engine component 106. The seal ring 120 is mechanically sprung to contact the sealing surface 108, i.e. the seal ring 120 is configured to at least partially clamp or wrap onto the sealing surface 108. In the exemplary embodiment in FIG. 3, the first sidewall 114 and the second sidewall 115 are parallel to one another. In other embodiments, the sidewalls 114, 115 of the seal ring housing 110 are generally conical and converging toward the sealing surface 108. The sidewalls 114, 115 guide the seal ring 120 to contact the sealing surface 108. The seal ring 120 may include at least one seal contact surface 122, of which the seal contact surface 122 is a surface on the seal ring 120 configured to contact the sealing surface 108. For example, the seal contact surface 122 may include a wear-resistant coating or a geometry defined by the sealing surface 108 e.g. an elongated flat surface parallel to the sealing surface 108. For the embodiment depicted, the seal ring 120 includes a second seal contact surface 123 contacting the first sidewall 114 of the seal ring housing 110. In other embodiments, the seal ring 120 contacts the sealing surface 108 or the first sidewall 114 without a geometry defined by the sealing surface 108 or without a wear-resistant coating specific to the seal contact surface 122, 123.

The embodiment as shown in FIG. 3 shows the relationship between the sealing surface 108, the seal housing 110, and the seal ring 120 as generally concentric. However, in other embodiments, the sealing system 98 may be adapted to more eccentric (i.e. not concentric) or angularly misaligned relationships between the sealing surface 108 and the seal housing 110 and seal ring 120.

Figure 4:
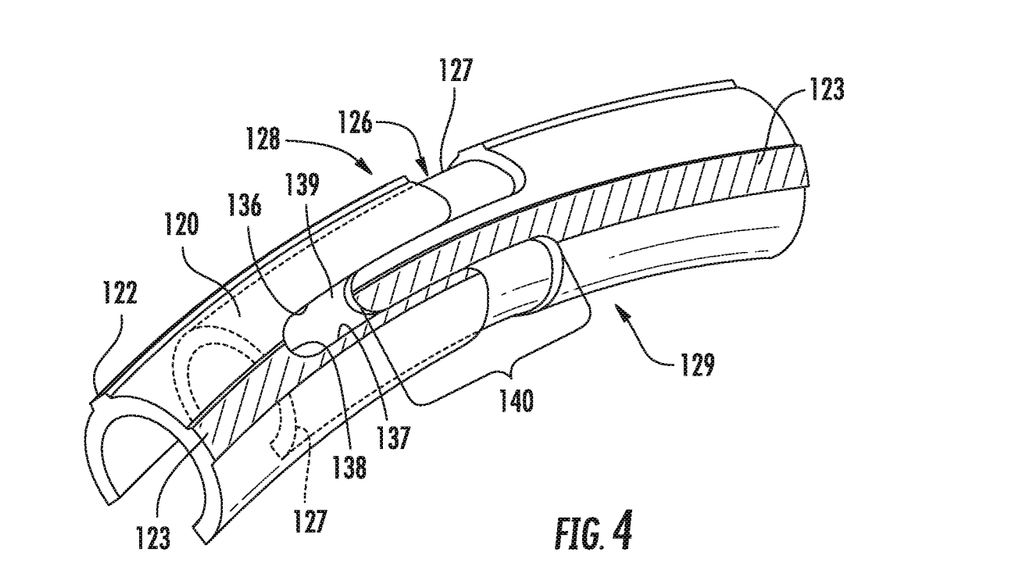
FIG. 4 is a perspective view of a portion of an exemplary seal ring.

Referring now to FIG. 4, a perspective view of a section of the seal ring 120 described above with regard to FIG. 3 is provided. As shown, the seal ring 120 includes an expandable joint defining a split 126 on a circumference of the seal ring 120 in which a first end 128 overlaps a second end 129 generally as a mitre step. However, in other embodiments, the split 126 may be configured as a square cut, an angle cut, a step cut, or a hook step, or another suitable cut to prevent or control fluid flow between the high pressure fluid 102 and the low pressure fluid 104. The expandable joint allows the seal ring 120 to expand or contract in diameter to allow for variations in diameter of a sealing surface 108 with which the sealing system 98 is configured.

The expandable joint defining the split 126 includes the first end 128 circumferentially overlapping the second end 129 to allow the expandable joint to expand or contract. The split 126 includes a first wall 136, a second wall 137, and an end wall 138, altogether defining a circumferentially extending slot 139 into which a portion 140 of the sealing surface 123 of the second end 129 is positioned. The portion 140 of the sealing surface 123 of the second end 129 positioned in the slot 139 is configured to move within the slot 139. As a non-limiting example, the portion 140 of the sealing surface 123 of the second end 129 may move within the slot 139 during assembly of the sealing system 98. In another example, the portion 140 of the sealing surface 123 of the second end 129 may move within the slot 139 due to thermal expansion and other movement of the seal ring 120, or the combustion section 26, or the turbine nozzle 68, or the engine 10. The second end 129 may further include an internal end portion 127 circumferentially extending into the first end 128. The internal end portion 127 may be joined to the second end 129 by a bonding process, such as, but not exclusively, brazing or by use of an adhesive. The internal end portion 127 may define a cross sectional area such that the internal end portion 127 may move within the first end 128. For example, where the seal ring 120 defines a ring-shaped cross section as shown in FIG. 4, the internal end portion 127 defines a ring-shaped cross section of a lesser radius than the cross section at the first end 128 such that the internal end portion 127 may circumferentially extend and move within the first end 128. The internal end portion 127 attached to the second end 129 is configured to circumferentially extend and move within the first end 128 such that the sealing surfaces 122, 123 may maintain contact with the sealing surface 108 and first sidewall 114 as shown in FIG. 3.

The seal ring 120 is mechanically sprung to contact the sealing surface 108, thus providing an initial seal. In the embodiment in FIG. 3, the seal ring 120 provides the entire spring force against the sealing surface 108. The seal ring 120 seals the high pressure fluid 102 from fluid communication with the low pressure fluid 104. This difference in pressure between the high pressure fluid 102 and the low pressure fluid 104 further augments sealing by the force of the high pressure fluid 102 acting upon the seal ring 120 and the seal housing 110.

The seal ring 120 or sealing surface 108 may include a wear-resistant coating that inhibits wear on either the seal ring 120 or the sealing surface 108. As the sealing system 98 may experience some movement, for example along the axial reference line 100, a wear-resistant coating prevents wear due to abrasion and enhances protection against high thermal conditions. For example, the wear-resistant coating may include tungsten carbide, cobalt, ceramic, chromium, or nitride coatings. The wear-resistant coating may be applied to the sealing surface 108 or the seal ring 120 generally, or the seal contact surfaces 122, 123 of the seal ring 120 in particular.

Figure 5:
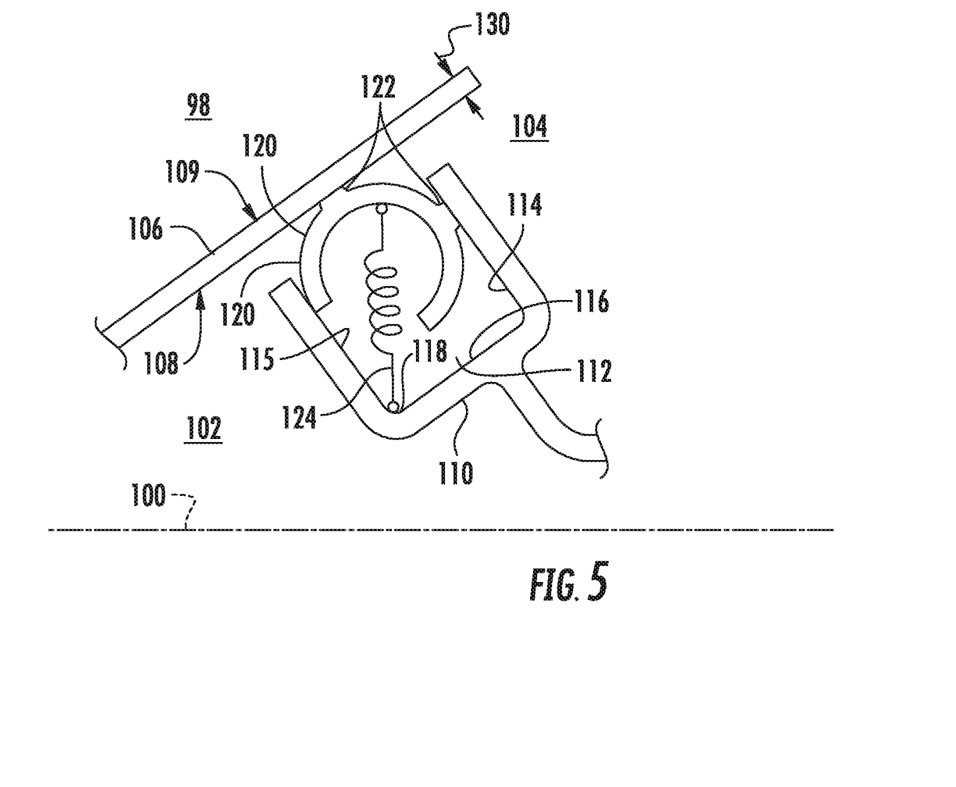
FIG. 5 is an embodiment of a sealing system shown in FIG. 3, including a spring.

Referring now to FIG. 5, a sealing system 98 in accord with another exemplary embodiment is provided. The exemplary sealing system 98 of FIG. 5 may be configured in substantially the same manner as the exemplary sealing system 98 described above with regard to FIGS. 3-4. However, for the embodiment in FIG. 5, the seal ring 120 is augmented by a spring 124 positioned between the seal ring 120 and the seal housing 110. The spring 124 may be constructed of round wire, flat wire, or of strip material, or may include a conical wave spring or a leaf spring, or another suitable spring as may be necessary depending on the environment into which the spring may be installed (e.g. temperature, pressure, displacement, acceleration, fluid type, etc.). In this embodiment, the spring 124 is disposed to a corner 118 in the seal ring groove 112. The spring 124 may be spot welded into the seal ring groove 112 for additional retention. It should also be appreciated that in other embodiments, the spring may be disposed generally within the seal ring groove 112 in any other suitable manner. However, in still other embodiments, the spring 124 may be retained by its placement within the seal housing 110 and between the sealing surface 108 without an additional retention mechanism such as spot welding. In yet other embodiments, the spring 124 may include a plurality of springs 124 positioned e.g. in circumferentially adjacent arrangement or as a plurality of members of a spring assembly within the seal housing 110 and between the sealing surface 108.

Figure 6:
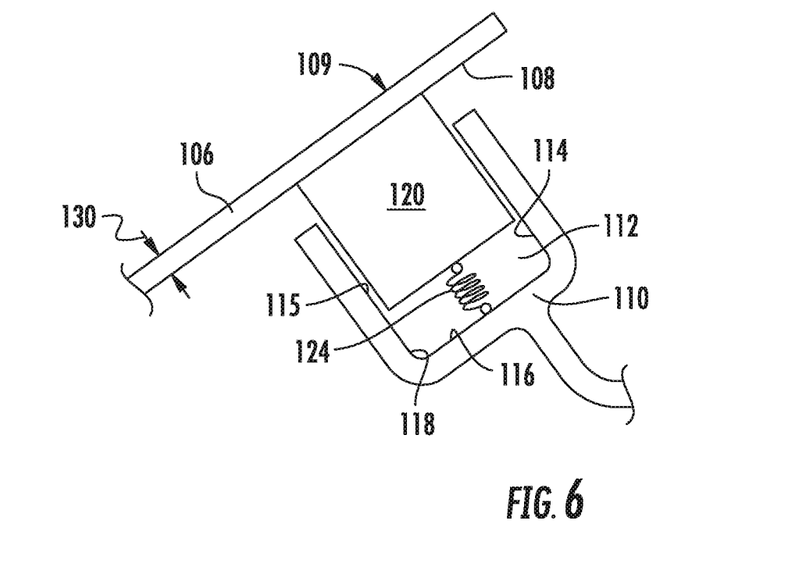
FIG. 6 is an embodiment of the sealing system as in FIG. 5, incorporating a seal ring with a rectangular cross section.

For example, referring now generally to FIGS. 6-11, sealing systems 98 in accordance with various other embodiments of the present disclosure are provided. Except as described below, each of the sealing systems 98 may be configured in substantially the same manner as the exemplary sealing system 98 described above with regard to FIGS. 3-4. FIG. 6 provides a seal ring 120 with a generally rectangular cross section. The seal ring 120 contacts the first sidewall 114 of the seal housing 110. The spring 124 augments the seal seating force the seal ring 120 applies to the sealing surface 108. The spring 124 is placed generally within the groove 112 defined by the seal housing 110.

Figure 7:
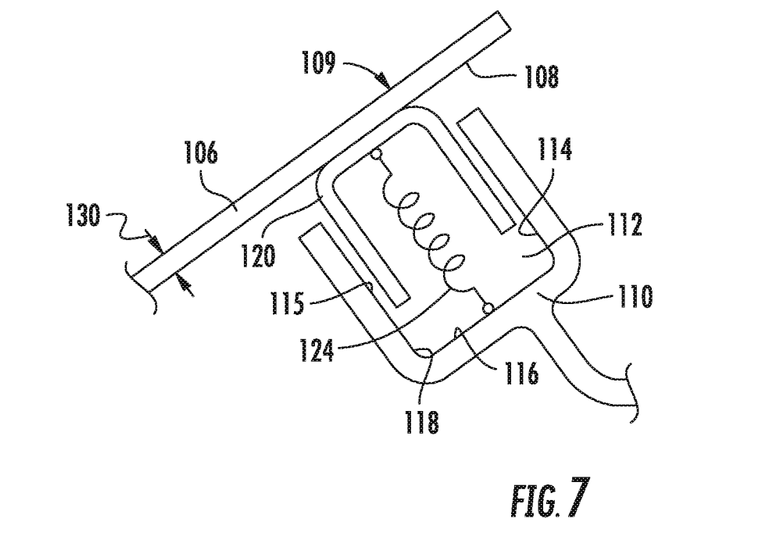
FIG. 7 is an embodiment of the sealing system as in FIG. 5, incorporating a seal ring with a U-shaped cross section.

FIG. 7 provides a sealing system 98 that includes a seal ring 120 with a generally U-shaped cross section, augmented by a spring 124 mechanically adhered (e.g. welded, adhesive, etc) to the seal ring 120 or the end wall 116. The U-shape provides a channel into which a flat or round wire wave spring (e.g., a Cockle or Marcel spring; not shown) can be readily installed or into which a plurality of spring segments can be installed.

Figure 8:
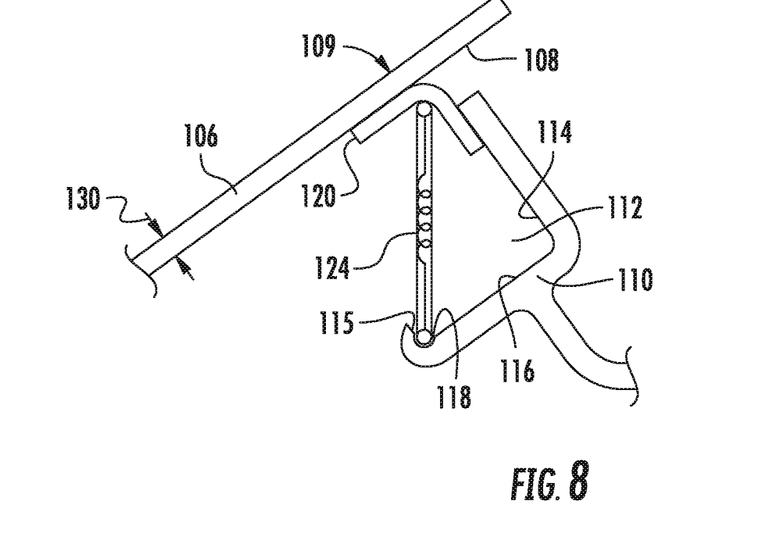
FIG. 8 is an embodiment of the sealing system as in FIG. 5, incorporating a seal ring with an L-shaped cross section.

FIG. 8 provides a sealing system 98 that includes a seal ring 120 with a generally L-shaped cross section, augmented by a spring 124. The first sidewall 114 is larger than the second sidewall 115, with the second sidewall 115 configured to curve toward the first sidewall 114 to retain the spring 124. The sidewalls 114, 115 retain the seal ring 120 within the groove 112 of the seal housing 110 while the seal ring 120 seals against the sealing surface 108.

Figure 9:
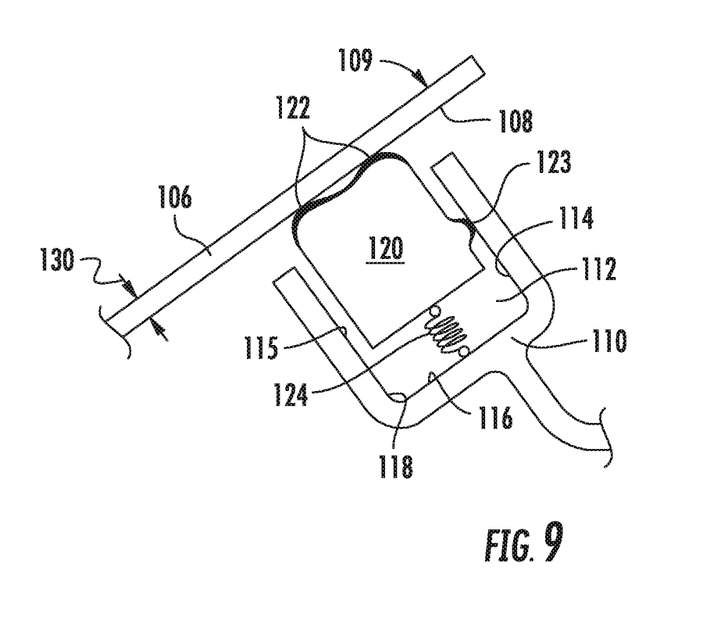
FIG. 9 is an embodiment of the sealing system as in FIG. 5, incorporating a seal ring with a generally oblong cross section.

FIG. 9 provides a sealing system 98 that includes a seal ring 120 with a generally oblong cross section and a plurality of seal contact surfaces 122 contacting the sealing surface 108. Additionally, a second seal contact surface 123 contacts the first sidewall 114 of the seal housing 110.

Figure 10:
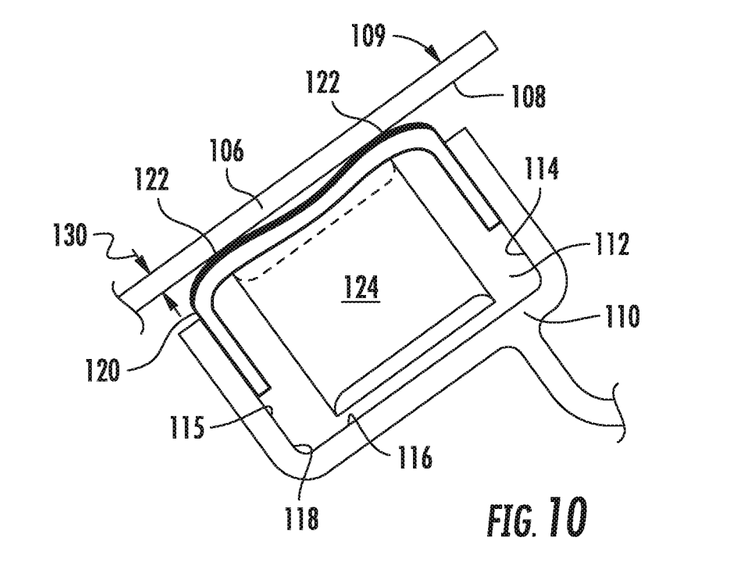
FIG. 10 is an embodiment of the sealing system as in FIG. 5, incorporating a seal ring with a generally U-shaped cross section.

FIG. 10 provides a sealing system 98 that includes a seal ring 120 with a generally C-shaped cross section and plurality of seal contact surfaces 122 contacting the sealing surface 108. Additionally, the seal ring 120 may contact the first sidewall 114 or the second sidewall 115, or both. The spring 124, made of strip material or a leaf spring, augments the seal the seal ring 120 applies to the sealing surface 108.

Figure 11:
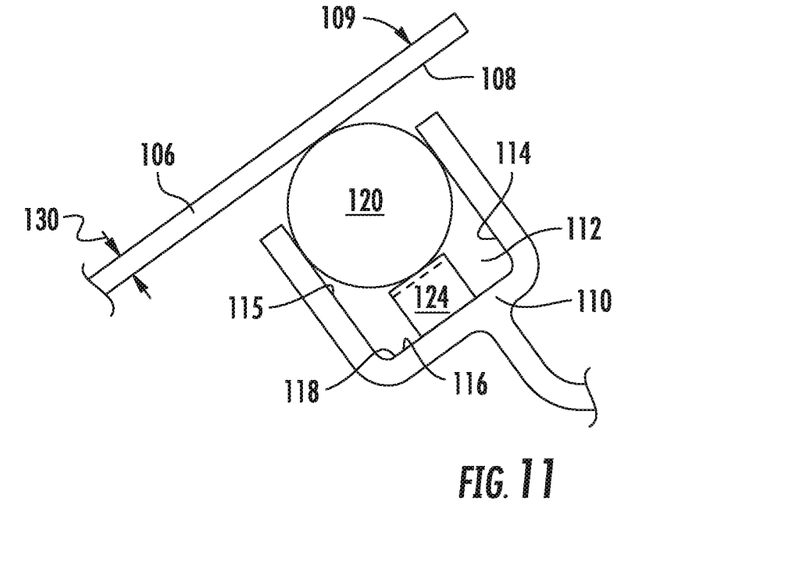
FIG. 11 is an embodiment of the sealing system as in FIG. 5, incorporating a seal ring with a generally circular cross section.

FIG. 11 provides a sealing system 98 that includes a seal ring 120 with a generally circular cross section, augmented by a spring 124, such as a wave spring or a leaf spring.

It should be appreciated that any variant of seal ring 120 cross section may include the seal contact surface 122 in which those specific portions of the seal ring 120 may continuously contact the adjacent seal surface 108 or the seal housing 110. Additionally, the seal ring 120 cross section may vary generally from those provided in FIGS. 6-11.

Figure 12:
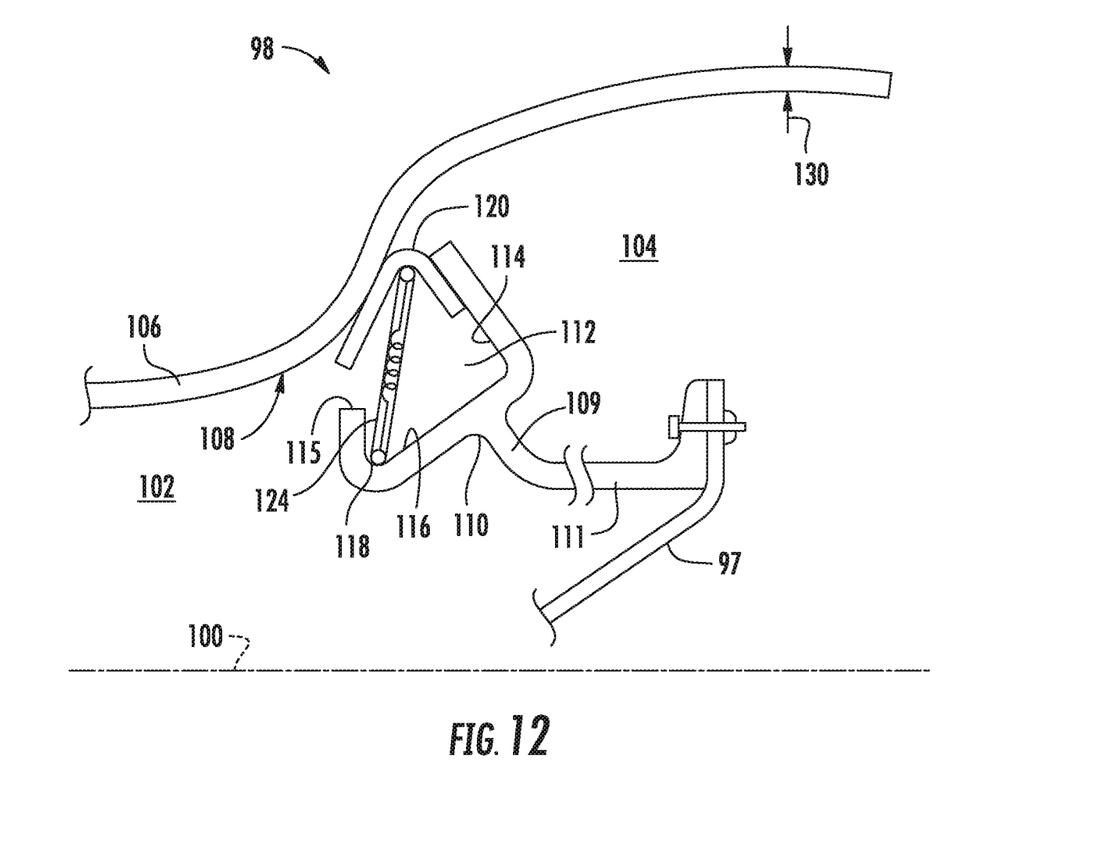
FIG. 12 is a cross sectional side view of an embodiment of the sealing system including a non-linear sealing surface.

Referring now to FIG. 12, a sealing system 98 in accordance with another exemplary embodiment is provided, in which the sealing surface 108 is generally non-linear relative to the axial reference line 100 of the engine component 106. The first sidewall 114 of the seal housing 110 is larger than the second sidewall 115, with the second sidewall curved toward the first sidewall 114 to retain the spring 124. The sidewalls 114, 115 retain the seal ring 120 within the groove 112 while the seal ring 120 springs toward the sealing surface 108. In one embodiment, the first sidewall 114 converges toward the second sidewall 115 and the sealing surface 108 to dispose the seal ring 120 to contact the sealing surface 108. In another embodiment, the first 114 and second 115 sidewalls converge toward one another toward the sealing surface 108. In yet another embodiment, the second sidewall 115 converges toward the first sidewall 114 to aid the seal ring 120 in contact the sealing surface 108 or to aid in retaining a spring 124 when one is present.

In still other embodiments, the seal housing 110 may include a plurality of grooves 112 to hold and position a plurality of seal rings 120 to seal against a sealing surface 108 to segregate a high pressure fluid 102 from a low pressure fluid 104. The grooves 112 may be axially spaced (along direction AA; see FIG. 2) to provide multiple contact locations for a seal contact surface 122 along a sealing surface 108. In yet other embodiments, a plurality of seal rings 120 are placed within the groove 112 of the seal housing 110.

Figure 13:
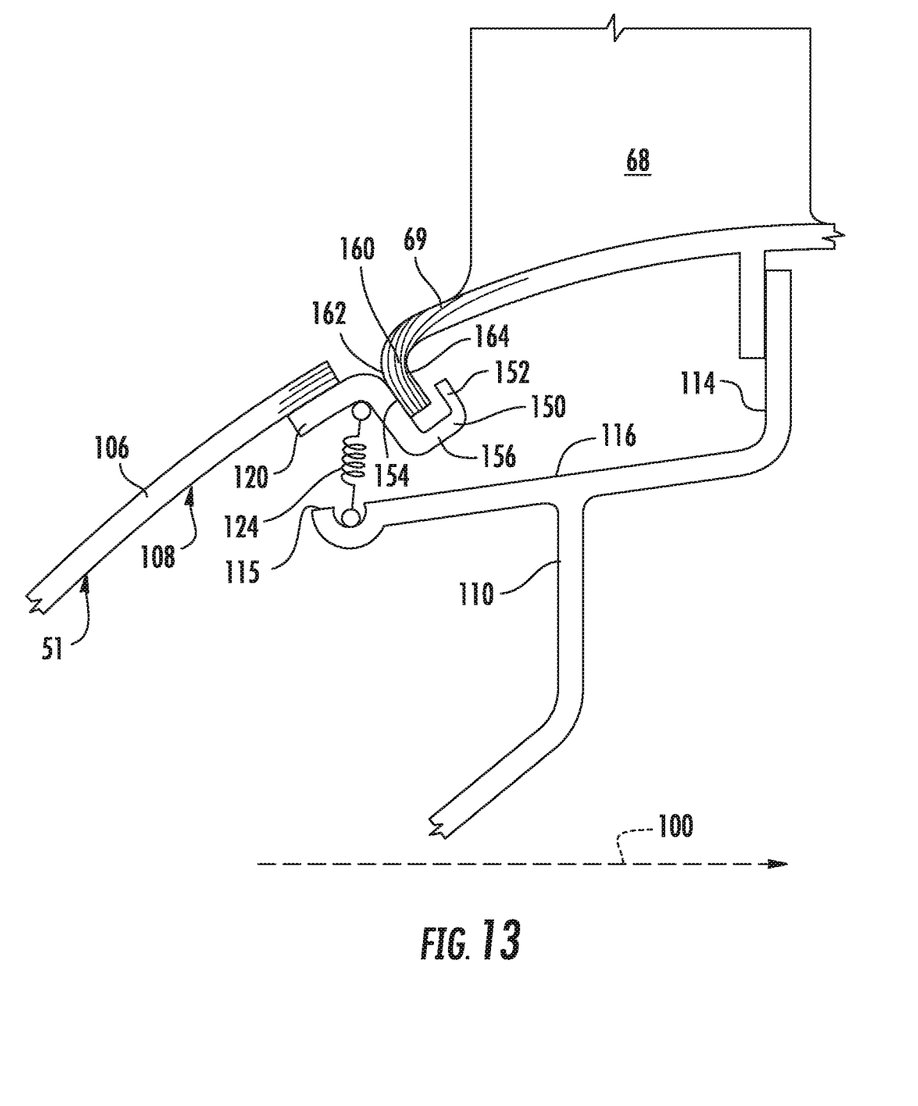
FIG. 13 is a cross sectional side view of an embodiment of the sealing system including a seal ring retention feature.

Referring now to FIG. 13, a sealing system 98 in accordance with another exemplary embodiment is provided, including a seal ring 120 with a generally L-shaped cross section, further including a retainer 150 configured to position the seal ring 120 onto an inner band 69 of the turbine nozzle 68. A spring 124 is positioned between an end wall 116, a second sidewall 115, and the seal ring 120 to further augment the spring force of the seal ring 120. It should be appreciated, that in other embodiments, however, the retainer 150 may additionally be included on seal rings 120 with other cross section shapes in accordance with various embodiments provided in the present disclosure.

The inner band 69 may include a curved portion 160 extending toward the seal ring 120, and towards the centerline 100 of the combustor 50. For example, where the seal ring 120 is applied to a sealing surface 108 that is an inside surface 51 of an inner liner 52, the curved portion 160 of the inner band 69 may extend radially inward toward the seal ring 120 and centerline 100. The retainer 150 includes a first wall 154 contacting an axially forward portion 162 of the curved portion 160 of the inner band 69, a second wall 152 opposite of an axially aft portion 164 of the curved portion 160, and a third wall 156 connecting the first wall 154 and the second wall 152. The first wall 154 may include a second seal ring contact surface 123 as described in various embodiments provided in the present disclosure.

The retainer 150 may, for example, define a curve, or hook, or clip, or other retention mechanism extending annularly throughout the circumference of the seal ring 120, configured to secure the seal ring 120 onto the curved portion 160 of the inner band 69. However, in another embodiment, the retainer 150 is segmented through one or several portions of the circumference. In yet another embodiment, the retainer 150 may be mechanically sprung to grab or pinch onto the curved portion 160 of the inner band 69. For example, the first wall 154 of the retainer 150 may converge toward the curved portion 160 and be mechanically sprung to contact the curved portion 160 to retain the seal ring 120 onto the inner band 69.

The sealing system 98 seals a high pressure fluid 102 from a low pressure fluid 104 where the engine component 106 is a non-cylindrical cross section, such as, but not limited to, a generally non-linear cross section or a frustoconical cross section. The sealing system 98 allows the engine component thickness 130 of the engine component 106 that includes the sealing surface 108 to be generally constant along the axial length AA of the engine component 106. For example, as shown in the embodiment in FIG. 3, where the engine component 106 is the combustor inner liner 52, the inside surface 51 and the outside surface 53 of the inner liner 52 are generally parallel, resulting in a thickness 130 that is generally constant throughout the axial length AA of the inner liner 52. Maintaining a generally constant thickness 130 may reduce the temperature differential of the inner liner 52 and thereby reduces stress and strain on the inner liner 52. Additionally, the risk of manufacturing defect associated with building up material or machining a cylindrical surface, and the costs incurred thereby, are avoided by maintaining a generally constant thickness 130 and a sealing surface 108 that is oblique relative to the axial reference line 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sealing system for a turbine engine comprising a combustor, the combustor comprising an inner liner having an inside surface, the inside surface defining an oblique sealing surface defining an annular shape about an axial centerline of the engine, the oblique sealing surface defining an oblique angle with the axial centerline of the turbine engine, wherein the oblique sealing surface also defines an oblique angle with the centerline of the combustor, the sealing system comprising:
    a seal housing disposed radially inward of the inner liner, wherein the seal housing is annular about the axial centerline of the turbine engine and includes a groove that is defined by a first sidewall, a second sidewall, and an end wall connecting the first sidewall and the second sidewall, wherein the end wall opposes the oblique sealing surface, wherein the first sidewall and the second sidewall are parallel, and wherein the first sidewall and the second sidewall define an oblique angular relationship to the centerline of the combustor;
    a sealing system first end coupled to the seal housing;
    a sealing system second and connected to a structural member and disposed radially inward of a turbine nozzle; and
    a seal ring positioned at least partially within the groove in the seal housing, wherein the seal ring acts upon the inside surface, and wherein the seal ring defines a seal contact surface for forming a seal with the oblique sealing surface of the combustor.

2. The sealing system as in claim 1, wherein the seal contact surface is an elongated flat surface parallel to the oblique sealing surface.

3. The sealing system as in claim 1, wherein the end wall defines an oblique angular relationship to the centerline of the combustor.

4. The sealing system as in claim 1, wherein the seal contact surface comprises a wear-resistant coating.

5. The sealing system as in claim 1, wherein the seal ring further comprises a second surface contacting the first sidewall.

6. The sealing system as in claim 1, wherein the seal ring defines a split at a circumference of the seal ring.

7. The sealing system as in claim 6, wherein the seal ring is mechanically sprung to contact the oblique sealing surface.

8. The sealing system as in claim 1, further comprising:
    a spring positioned between the seal housing and the seal ring.

9. A combustion chamber defining a centerline, including a structural member and a turbine nozzle, wherein the turbine nozzle includes an inner band defining a curved portion, the combustion chamber comprising:
    a liner having an inside surface, the inside surface defining an oblique sealing surface, the oblique sealing surface defining an annular shape about an axial centerline of a turbine engine and an oblique angle with the axial centerline of the turbine engine;
    a seal housing disposed radially inward of the inside surface, wherein the seal housing is annular about the axial centerline of the turbine engine and includes a groove that is defined by a first sidewall, a second sidewall, and an end wall connecting the first sidewall and the second sidewall, wherein the first sidewall and the second sidewall are parallel, and wherein the first sidewall and the second sidewall define an oblique angular relationship to the centerline of the combustion chamber; and
    a seal ring positioned at least partially within the groove in the seal housing, wherein the seal ring is positioned at least partially between the seal housing and the oblique sealing surface, wherein the seal ring acts upon the inside surface, and wherein the seal ring defines a seal contact surface for forming a seal with the oblique sealing surface of the liner.

10. The combustion chamber as in claim 9, further comprising:
    a spring, positioned between the seal housing and the seal ring.

11. The combustion chamber as in claim 9, wherein the seal housing further comprises:
    a first end; and
    a second end, wherein the end wall of the seal housing is attached to the first end, wherein the structural member of the combustion chamber is attached to the second end, and wherein the first end positions the seal housing proximate to the liner.

12. The combustion chamber of claim 11, wherein the first end comprises a first material having a first coefficient of thermal expansion and the second end comprises a second material having a second coefficient of thermal expansion.

13. The combustion chamber as in claim 9, wherein the seal ring is split at the circumference of the seal ring and is mechanically sprung to contact the oblique sealing surface.

14. The combustion chamber as in claim 9, wherein the oblique sealing surface further defines an oblique angle with the centerline of the combustion chamber.

* * * * *